United States Patent [19]
Strütt et al.

[11] Patent Number: 5,474,366
[45] Date of Patent: Dec. 12, 1995

[54] METHOD OF ASSEMBLING A BRUSH HAVING BRISTLES

[75] Inventors: Hansjürgen Strütt; Ulrich Zahoransky, both of Freiburg, Germany

[73] Assignee: Anton Zahoransky, Todtnau, Germany

[21] Appl. No.: 185,507

[22] Filed: Jan. 24, 1994

[30] Foreign Application Priority Data

Feb. 2, 1993 [DE] Germany ............... 43 02 870.5

[51] Int. Cl.$^6$ ................................. A46D 3/04
[52] U.S. Cl. ................................. 300/21
[58] Field of Search ................. 300/4, 5, 6, 8, 300/9, 21

[56] References Cited

U.S. PATENT DOCUMENTS

| | | | |
|---|---|---|---|
| 3,408,112 | 10/1968 | Piotrowski | 300/4 X |
| 4,635,313 | 1/1987 | Fassler et al. | 300/21 X |
| 4,637,660 | 1/1987 | Weihrauch | 300/21 |
| 5,033,797 | 7/1991 | Rueb | 300/5 |
| 5,352,025 | 10/1994 | Huang | 300/21 |

FOREIGN PATENT DOCUMENTS

| | | |
|---|---|---|
| 0142885 | 5/1985 | European Pat. Off. . |
| 2922877 | 12/1980 | Germany . |
| 3914821 | 11/1990 | Germany .............. 300/4 |

*Primary Examiner*—Timothy V. Eley
*Attorney, Agent, or Firm*—Darby & Darby

[57] ABSTRACT

An apparatus and method for making thermoplastic brushes includes a first unit for injection molding an anchoring plate having through openings for tufts of bristles. The apparatus further includes an arrangement for inserting the tufts in the openings so that an end portion of each tuft is adjacent a first side of the anchoring plate and a major portion of each tuft projects beyond the opposite second side of the anchoring plate. A heating plate is provided to form welds between the end portions of the tufts and the anchoring plate, and between the individual bristles of the tufts. This seals the through openings at the first side of the anchoring plate. The apparatus additionally includes a second unit for injection molding a covering member over the first side of the anchoring plate. To make a brush, the anchoring plate is injection molded using the first unit and the tufts are welded to the anchoring plate. If not already so positioned during welding of the tufts, the anchoring plate is arranged with the first side facing the second unit and the projecting portions of the tufts extending into holes adjacent the second side of the anchoring plate. The covering member is then injection molded over the first side of the anchoring plate. The anchoring plate with its sealed openings prevents the injected material for the covering member from entering the holes with the tufts.

13 Claims, 4 Drawing Sheets

Fig. 5    Fig. 5a    Fig. 6    Fig. 7
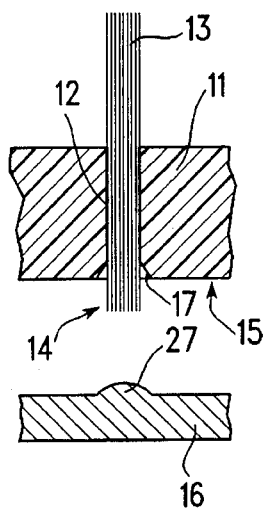
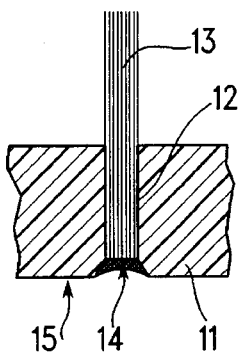
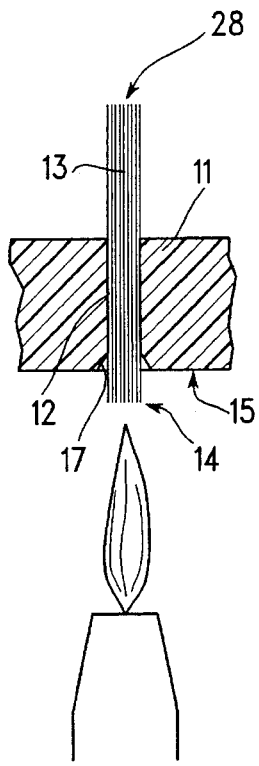
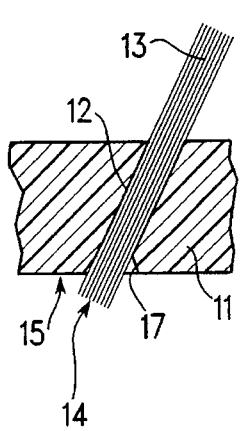
Fig. 8    Fig. 8a
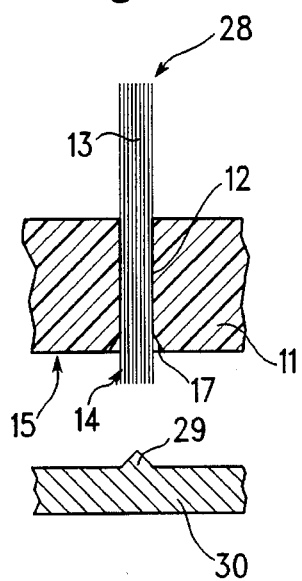
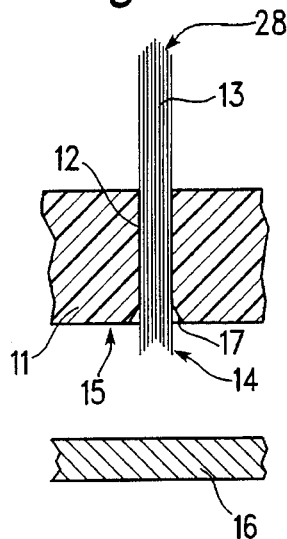

5,474,366

METHOD OF ASSEMBLING A BRUSH HAVING BRISTLES

FIELD OF THE INVENTION

The invention relates to brushes.

BACKGROUND OF THE INVENTION

Brushes having thermoplastic bodies and bristles are known. Such brushes can be manufactured by injection molding.

In many manufacturing processes, the thermoplastic bodies and bristles are "welded" to one another. One of the problems in these processes is to establish a durable connection between the body of a brush and the bristles. The European Patent Specification 0 142 885 discloses a procedure in which the bristles of a tuft are melted at one end in order to bond the individual bristles to each other and to form an enlargement. When the body of the brush is injection molded around the enlargement, the bristles are locked to the body.

The mold used for injection molding has passages which accommodate the bristles during the molding operation. Due to the high pressures employed for injection molding, another problem arises during the molding operation, namely, that of sealing the passages so that the injection molded material cannot enter the passages. The sealing problem is made more difficult by the fact that the cross-sectional areas of the tufts may not all be the same because the number of bristles per tuft can vary. Many procedures for sealing the passages are known. For instance, the German patent 29 22 877 provides the ends of the passages adjacent the brush body with constrictions or makes these ends conical.

SUMMARY OF THE INVENTION

It is an object of the invention to provide a method which enables a durable connection to be established between a brush body and its bristles.

Another object of the invention is to provide a method which does not require expensive sealing measures for bristle passages.

An additional object of the invention is to provide an apparatus which makes it possible to form a long-lived connection between a brush body and its bristles.

A further object of the invention is to provide an apparatus which allows expensive sealing measures for bristle passages to be eliminated.

It is also an object of the invention to provide a brush which permits a durable connection between brush body and bristles to be obtained.

Still another object of the invention is to provide a brush can be made without expensive sealing measures for bristle passages.

The preceding objects, as well as others which will become apparent as the description proceeds, are achieved by the invention.

One aspect of the invention resides in a method of making a brush. The method comprises the steps of: forming a first or anchoring body having a first side and a second side, and an opening extending between such sides; inserting at least one bristle in the opening so that a first portion of the bristle is located adjacent the first side and a second portion of the bristle is located adjacent the second side; establishing a seal between the bristle and the anchoring body in the region of the first side; and applying a second or covering body to the first body so that the covering body covers the first portion of the bristle.

The anchoring and covering bodies, as well as the bristles, may be made of thermoplastic material. Either the same material or different materials can be used for the anchoring body and covering body. The step of forming the anchoring body, and also the step of applying the covering body to the anchoring body, can involve injection molding of the anchoring and covering bodies. The step of establishing a seal between the bristle and the anchoring body can include fusing or melting the first portion of the bristle.

The anchoring body may be provided with a plurality of openings which extend between the first and second sides of the anchoring body and each such opening can be designed to receive a tuft of bristles. The inserting step then comprises introducing tufts of bristles into the respective openings while the establishing step involves the formation of seals between the anchoring body and all tufts. The covering body here covers that portion of each tuft adjacent the first side of the anchoring body.

In accordance with the invention, the anchoring body is made and the tufts inserted in the respective openings of this body. The tufts are thereupon connected to the anchoring body by forming seals between the anchoring body and the tufts in the region of one side of the anchoring body. During subsequent injection molding of the covering body, the mold passages provided for the bristles are sealed by the anchoring body and the sealing connections with the tufts so that virtually none of the injection molded material for the covering body can penetrate to the tufts.

The mold passages which accommodate the tufts while the covering body is being injection molded can be in the form of blind bores or through holes. If the mold passages are constituted by blind bores, the tufts are mounted on the anchoring body and then inserted in the bores from the interior of the mold. On the other hand, if the mold passages are in the form of through holes, the anchoring body can be positioned in the mold before the tufts are connected to the anchoring body. The tufts can subsequently be conveyed to the anchoring body directly through the holes from externally of the mold and thereupon joined to the anchoring body.

The tufts can be advanced to the mold directly from one or more supply reels. It is also possible to supply the tufts to the mold using a perforate plate with apertures arranged in the same pattern as the mold passages for the tufts. The tufts are inserted in the apertures and the plate is then positioned so that the apertures are in register with the mold passages. The tufts are now expelled from the apertures into the mold passages.

When the tufts are fed to the anchoring body through the mold passages for the tufts, it is possible to shape the tufts, and impart a contour to the free ends of the latter, during or after the feeding operation. This can be accomplished by shifting the bristles of a tuft longitudinally relative to one another. A separate production step following manufacture of a brush can thereby be avoided.

The anchoring and covering bodies may be made in the same mold. Here, the step of inserting the tufts in the openings of the anchoring body, as well as the step of establishing seals between the anchoring body and the tufts, can also be carried out in such mold. Alternatively, the anchoring body may be formed in a first mold and then transferred to a second mold where the tufts are inserted, the seals established and the covering body applied to the anchoring body.

Another aspect of the invention resides in an apparatus for making brushes, particularly plastic brushes. The apparatus comprises: means for forming a first or anchoring body having a first side and a second side, and an opening extending between the first and second sides; means for inserting at least one bristle in the opening so that a first portion of the bristle is located adjacent the first side and a second portion of the bristle is located adjacent the second side; means for establishing a connection between the bristle and the anchoring body in the region of the first side; and means for applying a second or covering body to the anchoring body in the region of the connection.

As mentioned previously, the anchoring and covering bodies, as well as the bristles, may be made of thermoplastic material with either the same material or different materials being used for the anchoring body and covering body. The forming means, as well as the applying means, can include injection molding components.

The forming means may be designed to provide the anchoring body with a plurality of openings which extend between the first and second sides of the anchoring body and these openings can be dimensioned to receive tufts of bristles. The inserting means is then equipped to introduce tufts of bristles into the respective openings while the establishing means is arranged to form connections between the anchoring body and all tufts. The establishing means is preferably equipped to produce sealing connections between the anchoring body and the tufts. The applying means is advantageously designed to cover the connections between the anchoring body and the tufts.

In accordance with the earlier description, an anchoring body having through openings for tufts of bristles is produced in a first operation and makes up part of a brush. Tufts of bristles are inserted in the openings and are joined to the anchoring body by seals. A covering body constituting another part of the brush is injection molded in a second operation and covers the previously established connections between the anchoring body and the tufts. By way of example, the covering body can make up the remainder of the brush. During injection molding of the covering body, the anchoring body is disposed between the injection molding chamber of the mold and the mold passages provided for the bristles. Since the tufts are joined to the anchoring body via seals, the anchoring body serves as a sealing partition between the mold passages and the molding chamber. The seals formed at the mold passages by the bristles themselves accordingly play no role, or only a subordinate role, in sealing the mold passages from the molding chamber.

The forming means may include a first group of molds for making anchoring bodies and the applying means may include a second group of molds for accommodating tufted anchoring bodies and injection molding covering bodies. The first and second groups can constitute part of a unit having one or more rotary mechanisms or turntables each of which supports at least one group of molds. The brushes can be manufactured in their entirety with such an arrangement and need not be removed from the unit so that laborious intermediate transfers and turning operations are unnecessary.

It is preferred for the establishing means to be provided with a heating plate for producing the seals between the anchoring body and the tufts.

The forming means and/or the applying means may constitute part of a unit having two or more relatively shiftable mold members of which one can accommodate the anchoring body. The mold members are movable between a closed position and an open position in which the mold members define a gap. The heating plate can here be movable into the gap and arranged to be positioned next to the anchoring body.

The heating plate functions to form seals between the anchoring body and the tufts by fusing or melting portions of the tufts. For instance, the tufts may be inserted in the openings of the anchoring body so that an end of each tuft is located at a predetermined side of the anchoring body adjacent an edge of the respective opening. The heating plate then melts these tuft ends to anchor the tufts in the anchoring body. The fused ends establish connections with the anchoring body at the predetermined side of the latter in the regions of the edges of the openings. During melting, the ends of the individual bristles of a tuft form a plastic, continuous melt so that, following fusion, the predetermined side of the anchoring body constitutes a continuous seal. Upon subsequent injection molding of the covering body, no injected material can penetrate to the mold passages housing the tufts, even at high injection pressures.

When the mold passages are in the form of through holes, the part of the mold containing the passages may be connected to a vibrator or similar device. This allows feeding of the tufts through the holes to be enhanced, particularly in cases where the mold passages are provided, for example, with conical or like portions in order to tightly squeeze the tuft ends.

An additional aspect of the invention resides in a brush. The brush comprises: a first or anchoring body having a first side and a second side, and an opening extending between these sides; a bristle in the opening having a first portion in the region of the first side and a second portion in the region of the second side; and a second or covering body connected to the first body and covering the first portion of the bristle. The anchoring body and the bristle are bonded to one another by a seal in the region of the first side of the anchoring body.

BRIEF DESCRIPTION OF THE DRAWINGS

Other features and advantages of the invention will become apparent from the following detailed description of preferred embodiments when read in conjunction with the accompanying drawings.

FIG. 5 is a fragmentary sectional view illustrating one manner of anchoring a tuft of bristles in a brush according to the invention;

FIG. 5a is similar to FIG. 5 but shows the tuft anchored in the brush;

FIG. 6 is a fragmentary, partly sectional view illustrating another manner of anchoring a tuft of bristles in a brush according to the invention;

FIG. 7 is a fragmentary sectional view of an additional embodiment of a brush in accordance with the invention;

FIG. 8 is a fragmentary, partly sectional view illustrating the shaping of a tuft of bristles for a brush according to the invention;

FIG. 8a is a fragmentary, partly sectional view showing the tuft of FIG. 8 after shaping together with a device for anchoring the shaped tuft in the brush.

DESCRIPTION OF PREFERRED EMBODIMENTS

Figure 1:
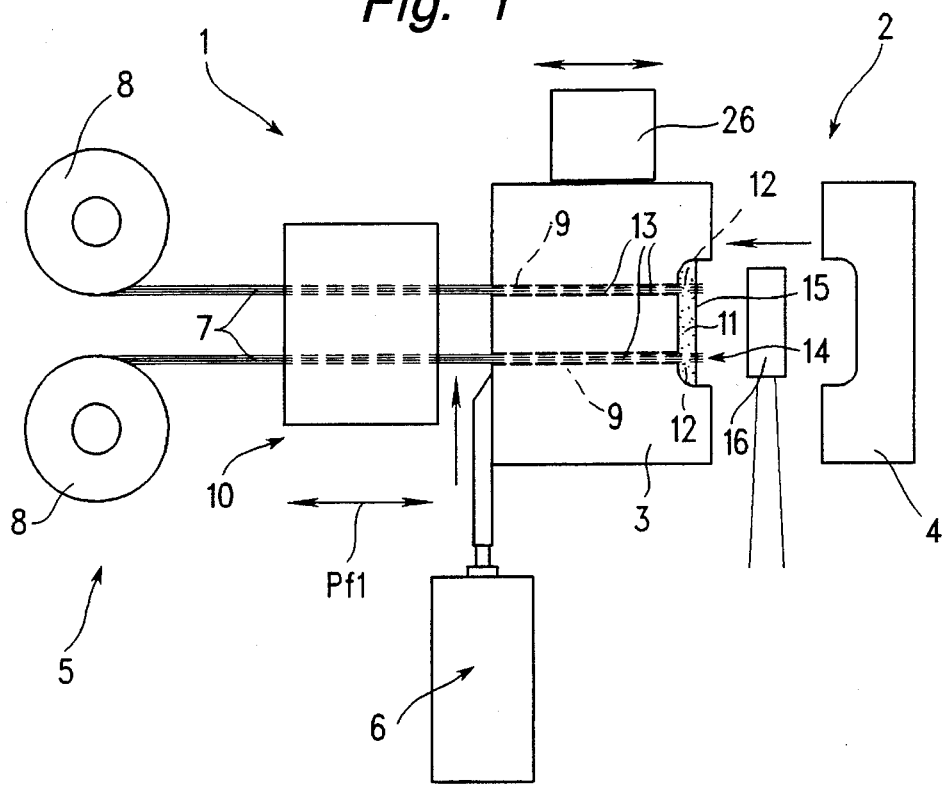
FIG. 1 is a schematic side view of one embodiment of an apparatus according to the invention for making brushes in accordance with the invention.

In FIG. 1, an apparatus according to the invention for making brushes in accordance with the invention is identified generally by the reference numeral 1. The apparatus 1, which is designed to produce thermoplastic brushes, includes an injection mold 2 made up of two mold sections or members 3 and 4. The apparatus 1 further includes a device 5 for feeding strands or bundles of bristles 7 to the mold 2 and a cutter 6 for severing the strands 7 to form tufts 13. The bristles can be composed of a thermoplastic material.

The feeding device 5 comprises reels 8 which supply the strands 7 to the mold 2. The feeding device 5 additionally comprises an advancing mechanism 10 which is movable back-and-forth in the directions indicated by the double-headed arrow Pf1. The advancing mechanism 10 serves to advance the strands 7 towards the mold 2 in steps. To this end, the advancing mechanism 10 is provided with clamping elements which grip the strands 7 when the advancing mechanism 10 moves to the right in FIG. 1. The advancing mechanism 10 travels a predetermined distance to the right while gripping the strands 7 and then releases the latter. The advancing mechanism 10 thereupon retracts the same distance to the left at which time the advancing mechanism 10 once again clamps the strands 7 preparatory to moving to the right. The cutter 6 severs the strands 7 prior to each displacement of the strands 7 towards the mold 2.

The mold section 3 has an interior compartment which accommodates a first or anchoring body 11 provided with through openings 12 which are designed to receive the tufts 13. The tufts 13 are inserted in the openings 12 in such a manner that the leading ends 14 of the tufts 13 are located adjacent that side of the anchoring body 11 which faces away from the mold section 3. In the finished brush, the leading ends 14 form the inner ends of the tufts 13 while the side of the anchoring body 11 facing away from the mold section 3 constitutes the inner side of the anchoring body 11. This can be seen in FIGS. 2 and 3 which illustrate different embodiments of a toothbrush 19 in accordance with the invention.

The mold sections 3 and 4 are displaceable relative to one another between a closed position and an open position shown in FIG. 1. In the open position, the mold sections 3 and 4 define a gap. A heating plate 16 for heating the inner ends 14 of the tufts 13 is pivotable or otherwise movable into the gap and can be positioned in the vicinity of the inner ends 14. The heating plate 16 may, for instance, be an electrical heating plate. As will be explained below, the inner ends 14 are fused or melted by the heating plate 16 in order to establish bonds with the anchoring body 11. Such bonds also form seals between the tufts 13 and the anchoring body 11.

The strands 7 are conveyed to the openings 12 via through holes or mold passages 9 in the mold section 3. The holes 9 may be arranged in the same pattern as the openings 12. The inner ends of the holes 9, that is, the ends of the holes 9 in the interior of the mold 2, can be provided with sealing edges. Alternatively or additionally, at least a portion of each of the holes 9, e.g., the ends of the holes 9, can taper down conically towards the interior of the mold 2.

A vibrator 26 is mounted on the mold section 3 and is put into operation during transport of the strands 7 through the holes 9. This creates a tendency for the individual bristles to assume parallel positions and thereby increase the packing density. Moreover, vibration of the mold section 3 facilitates movement of the strands 7 through the holes 9 when the strands 7 are subjected to a high counterpressure. This might be the case, for example, if the inner ends of the holes 9 taper down conically towards the interior of the mold 2.

Cooling means may be provided in the region of the holes 9 and/or in the region of the compartment which accommodates the anchoring body 11. The cooling means preferably includes one or more cooling channels.

A method of making a brush in accordance with the invention using the apparatus 1 of the invention will be described with reference to FIGS. 4, 4a, 4b, 4c and 4d.

Figure 4:
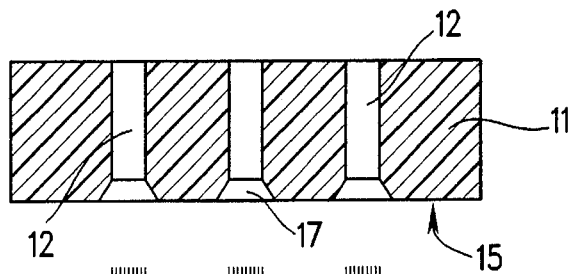
FIGS. 4, 4a, 4b, 4c and 4d are sectional views showing a brush according to the invention at different stages of manufacture.

The anchoring body 11 with the through openings 12 is injection molded from a thermoplastic material. The molded, thermoplastic anchoring body 11 is shown in FIG. 4 where the numeral 15 identifies the inner side of the anchoring body 11. The through openings 12 have conical inner ends 17 which are located adjacent the inner side 15 and taper down in a direction away from the latter.

Figure 4A:
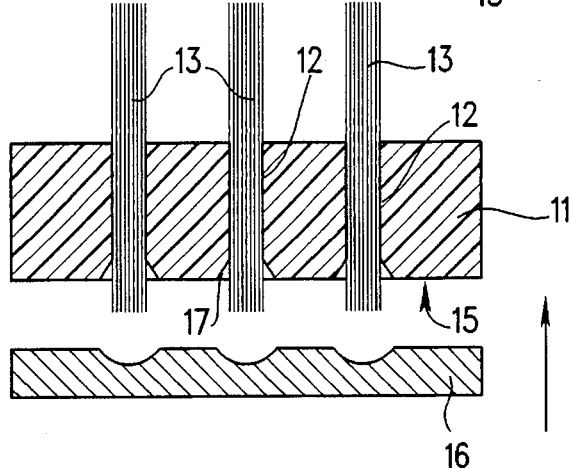

Following injection molding of the anchoring body 11, the tufts of bristles 13 are passed through the openings 12 from the outer side of the anchoring body 11 towards the rear side 15 thereof. The tufts 13 are inserted in the openings 12 in such a manner that the inner ends 14 of the tufts 13 are disposed adjacent, but project slightly beyond, the rear side 15. This is illustrated in FIG. 4a. Once the tufts 13 have been positioned in the openings 12, the heating plate 16 is shifted in the direction of the arrow of FIG. 4a to bring the heating plate 16 into contact with the inner ends 14 of the tufts 13.

Figure 4B:
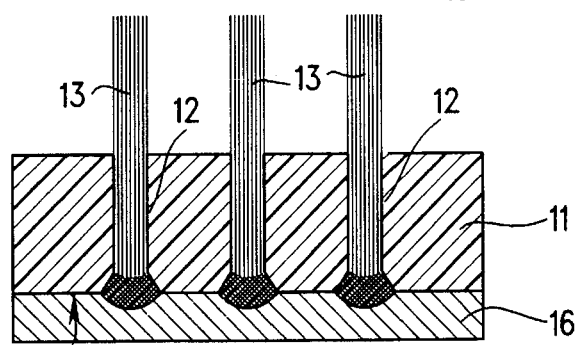
Figure 4C:
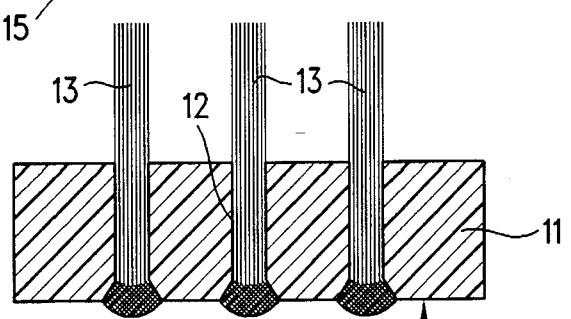
Figure 4D:
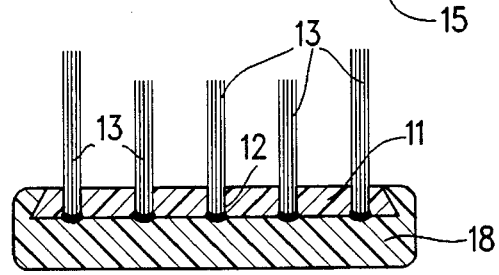

As shown in FIG. 4b, the heating plate 16 fuses or melts the inner ends 14 of the tufts 13 so that the individual bristles of each tuft 13 are welded to one another. After the inner ends 14 have been fused, the heating plate 16 is withdrawn from the anchoring body 11 per FIG. 4c. The welds created by the fused inner ends 14 form bonds or connections with the anchoring body 11 in the regions of the inner edges of the openings 12. These bonds, which may constitute welds, form seals so that the inner side 15 of the anchoring body 11 is sealed in the areas of the openings 12. The fused inner ends 14 fill the conical inner ends 17 of the openings 12 thereby enhancing anchoring of the tufts 13 to the anchoring body 11.

Insertion of the tufts 13 in the openings 12, as well as bonding or welding of the inner ends 14 to the anchoring body 11, can be carried out in the mold 2 of FIG. 1. When the bonding operation is performed in the mold 2, the mold sections 3,4 are in their open position during the bonding operation so that the heating plate 16 can be located in the gap between the mold sections 3,4 and adjacent to the anchoring body 11. Following the bonding operation, the heating plate 16 is pivoted out of the gap and the mold sections 3,4 are moved to the closed position. Thereafter, a second injection molding procedure is carried out with the anchoring body 11 located in the mold 2 and the tufts 13 extending into the holes 9. It will be recalled that the anchoring body 11 was formed in a previous injection molding procedure. In the course of the second injection molding procedure, a thermoplastic material is injected around the anchoring body 11 from the inner side 15 of the latter so that the inner ends 14 of the tufts 13 are covered. The thermoplastic material used for the second injection molding procedure may be the same as or different from the thermoplastic material of the anchoring body 11.

During the second injection molding procedure, the holes 9 are sealed by the tufts 13 therein and also by the anchoring body 11. No injection molded material can penetrate into the holes 9 from the inner side 15 of the anchoring body 11 because the regions of the openings 12 are fully sealed via the welds formed by the fused inner ends 14 of the tufts 13 and the welds connecting the fused inner ends 14 to the anchoring body 11.

The second injection molding procedure produces a covering or second body 18 which is connected to the anchoring body 11. The covering body 18, which can be seen in FIG. 4d, covers the inner ends 14 of the tufts 13.

When the second injection molding procedure is finished, a completed brush is obtained. The mold 2 is now opened and the brush ejected. If necessary, the brush can be subjected to one or more finishing operations.

Figure 2:
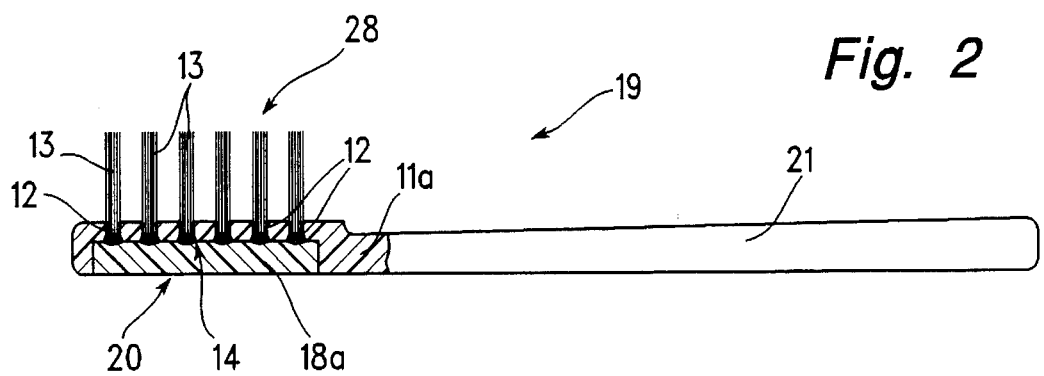
FIG. 2 is a partly sectional view of one embodiment of a brush according to the invention.
Figure 3:
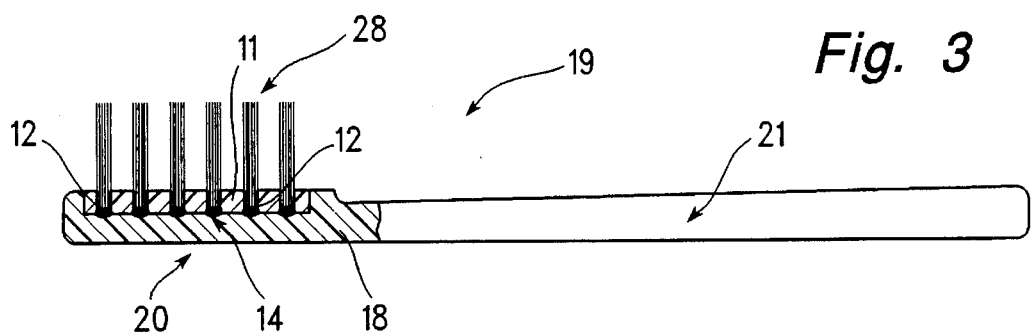
FIG. 3 is similar to FIG. 2 but illustrates another embodiment of a brush in accordance with the invention.

In the toothbrush 19 of FIG. 3, the anchoring body 11 is a plate-like component which can extend to the regions of the side faces of the toothbrush 19. Advantageously, the "dividing seam" coincides with the parting plane of the mold 2. No additional seams or the like are then observable following production. The covering body 18 in the toothbrush 19 of FIG. 2 includes a handle 21 and an adjoining head 20 which at least partly surrounds the anchoring body 11 and grips the latter. The handle 21 and head 20 are integral with one another.

The anchoring body and covering body can be reversed as illustrated in FIG. 2 where the same reference numerals as in FIG. 3 are used to identify corresponding elements with the exceptions of the anchoring body and covering body. In FIG. 2, the anchoring body is denoted by 11a while the covering body is denoted by 18a. The anchoring body 11a comprises the head 20 of the toothbrush 19 and the integral handle 21. The head 20 of the toothbrush 19 of FIG. 2 is provided with a recess on the back side thereof and the covering body 18a is injection molded into this recess during the second injection molding operation.

The anchoring body and covering body may be designed differently than in FIGS. 2 and 3. Furthermore, the brush of the invention may include more than two bodies.

The anchoring body may be produced in a mold other than the mold 2 and then transferred to the mold 2 for insertion of the tufts and injection molding of the covering body. If the anchoring body is made in a mold other than the mold 2, it is also possible to insert and anchor the tufts in the anchoring body before the anchoring body is placed in the mold 2 for application of the covering body thereto. In the latter case, the anchoring body is brought into the mold 2 and the tufts introduced into the through holes 9 from the interior of the mold 2. The through holes 9 can here also be replaced by blind bores. Introduction of the tufts into holes or bores of the mold section 3 from the interior of the mold 2 contrasts with the showing of FIG. 1 where the tufts are passed into the through holes 9 from the exterior of the mold 2.

It is currently preferred for both the anchoring body and covering body to be injection molded in the mold 2. During the first injection molding procedure in which the anchoring body is produced, one or more filling components may be disposed in the portion of the mold 2 which is unused while the anchoring body is being made. The through openings in the anchoring body can be formed by placing pins at the intended locations of the openings. Such pins can be mounted in the through holes 9 of the mold section 3 or on a filling component. Subsequent to the first injection molding procedure, the pins, as well as the filling component or components, are removed and the tufts are inserted in the through openings of the anchoring body and welded to the latter. This is followed by the second injection molding procedure in which the covering body is produced.

When both the anchoring body and covering body are injection molded in the mold 2, the portion of the mold 2 which is injected with thermoplastic material during the first injection molding procedure may be considered to constitute, or constitute part of, a means for forming the anchoring body. Similarly, the portion of the mold 2 which is injected with thermoplastic material during the second injection molding procedure may be considered to constitute, or constitute part of, a means for applying the covering body to the anchoring body.

The apparatus of the invention may include a unit having one or more first groups of molds for making the anchoring bodies and one or more second groups of molds for accommodating tufted anchoring bodies and injection molding covering bodies. This unit may be equipped with one or more rotary mechanisms or turntables each of which carries a group of molds. Brushes according to the invention can be manufactured in their entirety with such an arrangement and need not be removed from the unit so that laborious intermediate transfers and turning operations are unnecessary.

Figure 9:
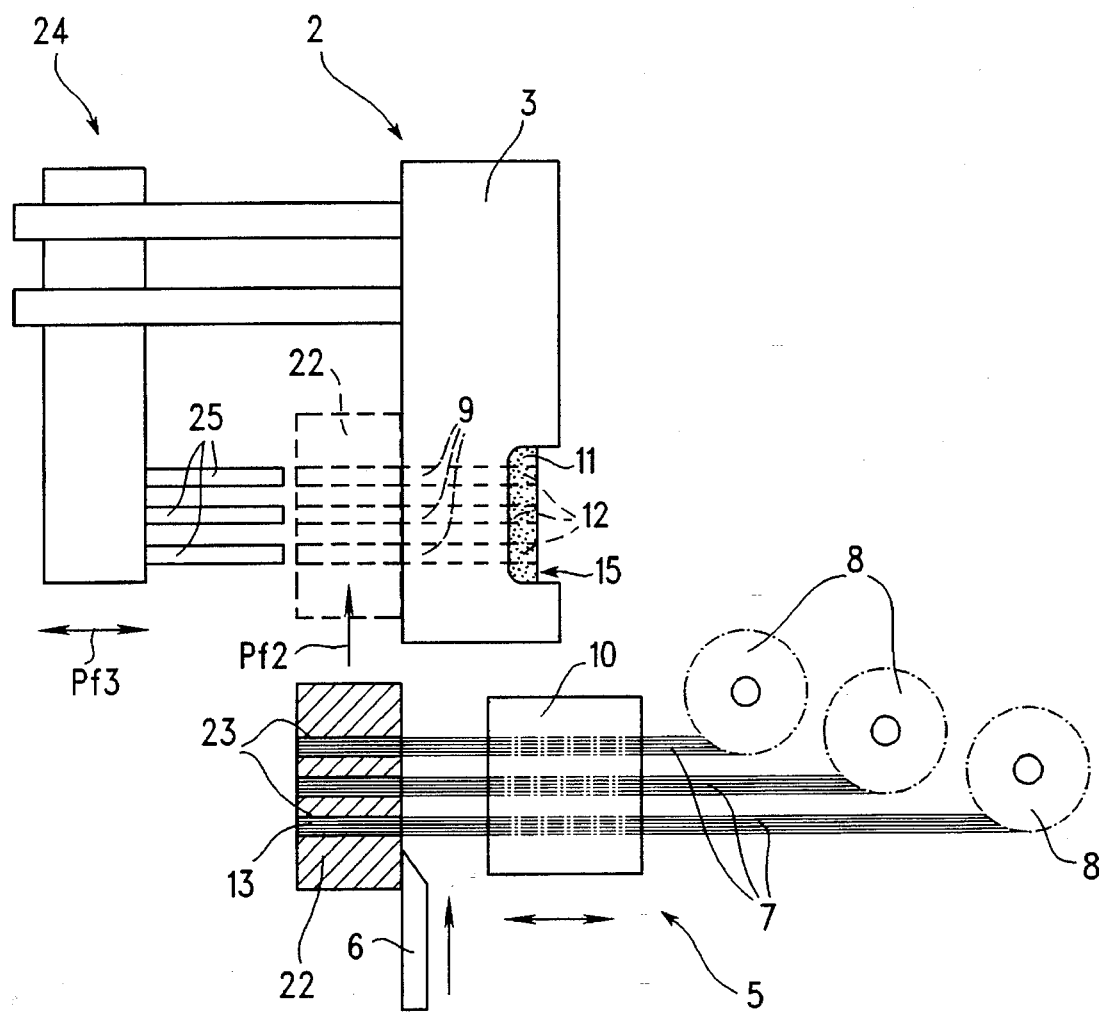
FIG. 9 is a schematic side view of another embodiment of an apparatus in accordance with the invention for making brushes according to the invention.

In FIG. 1, the tufts 13 are conveyed to the mold 2 directly from the supply reels 8. FIG. 9, where the same reference numerals as in FIG. 1 are used to identify corresponding elements, shows an apparatus in which the tufts 13 are fed to the mold 2 in a different manner.

Turning to FIG. 9, a perforate plate 22 with through apertures 23 is located outside of the mold 2. The apertures 23 are arranged in the same pattern as the through holes 9 of the mold section 3 and the through openings 12 of the anchoring body 11.

The strands 7 are withdrawn from the supply reels 8 by the advancing mechanism 10 which, in turn, introduces the strands 7 into the apertures 23 of the perforate plate 22. When appropriate lengths of the strands 7 have been passed into the apertures 23, the strands 7 are severed by the cutter 6 to form the tufts 13 in the plate 22.

Once the strands 7 have been severed, the perforate plate 22 is displaced sideways towards the mold section 3 per the arrow Pf2. As indicated by broken lines, the perforate plate 22 is positioned adjacent to the mold section 3 in such a manner that the apertures 23 register with the holes 9 of the mold section 3.

An expelling mechanism 24 is mounted next to the mold section 3 at a spacing from the latter. The expelling mechanism 24 carries a set of pins 25 which are arranged in the same pattern as the apertures 23 of the perforate plate 22 and are movable towards and away from the mold section 3 as shown by the double-headed arrow Pf3. When the pins 25 are shifted towards the mold section 3, they enter the apertures 23 and expel the tufts 13 therefrom. The pins 25 transfer the tufts 13 into the holes 9 of the mold section 3 and the openings 12 of the anchoring body 11.

The arrangement to be used for supplying the tufts 13 to the holes 9 of the mold section 3 and the openings 12 of the anchoring body 11 depends on the available space.

FIG. 5 shows a heating plate 16 having projections 27 at the locations which confront the inner ends 14 of the tufts 13 during melting of the inner ends 14. When the inner ends 14 have been plasticized, the projections 27 press the inner ends 14 into the conical inner ends 17 of the through openings 12 to thus bond the inner ends 14 to the anchoring body 11. FIG. 5a illustrates a tuft 13 after the respective inner end 14 has been bonded to the anchoring body 11 so as to anchor the tuft 13 to the anchoring body 11.

Instead of the heating plate 16, a flame can be used to fuse the inner ends 14 of the tufts 13. This is schematically shown in FIG. 6.

FIG. 7 illustrates that the through openings 12 of the anchoring plate 11 can be inclined.

In FIGS. 8 and 8a, the reference numeral 28 identifies the outer end of a tuft 13, that is, the usable end of a tuft 13. FIGS. 8 and 8a demonstrate that it is possible to shape the tufts 13 prior to melting of the inner ends 14 in order to contour the outer ends 28. Shaping of a tuft 13 can be accomplished by shifting at least some bristles of the tuft 13 longitudinally relative to others of the bristles. The heating plate 16 can be used to shape the tufts 13 or, alternatively, a contouring plate 30 provided with shaping protrusions 29.

Various modifications can be made within the meaning and range of equivalence of the appended claims.

We claim:

1. A method of making a brush, comprising the steps of:

providing a first body having a first side and a second side, and an opening extending between said sides;

inserting at least one bristle, having an inner portion and an outer portion, into said opening from said second side to said first side so that said inner portion of said at least one bristle is located adjacent said first side and projects slightly beyond said first side and said outer portion of said at least one bristle is located adjacent said second side; and establishing a connection between said at least one bristle and said first body in the region of said first side.

2. The method of claim 1, wherein the providing step comprises forming said first body by injection molding said first body.

3. The method of claim 1, wherein the establishing step comprises fusing said inner portion of said at least one bristle.

4. The method of claim 3, wherein the fusing results in said seal.

5. The method of claim 1, further comprising the step of applying a second body onto said first body so that said second body covers said inner portion of said at least one bristle.

6. The method of claim 5, wherein said first body comprises a different substance than said second body.

7. The method of claim 5, wherein the applying step comprises injection molding said second body onto said first body.

8. The method of claim 1, wherein said first body and said at least one bristle comprise thermoplastic material.

9. The method of claim 1, wherein the inserting and establishing steps are performed in a mold and the inserting step comprises passing said at least one bristle through part of said mold from the exterior to the interior of said mold and into said opening.

10. The method of claim 9, wherein said mold has a passage extending between said exterior and said interior thereof and the inserting step comprises introducing said at least one bristle into an aperture of a perforate member, aligning said passage and said aperture with one another, and conveying said at least one bristle from said aperture to said passage.

11. The method of claim 9, wherein the inserting step comprises directly feeding said at least one bristle to said mold.

12. The method of claim 1, wherein the forming step is performed in a first mold and the inserting, establishing and applying steps are performed in a second mold.

13. The method of claim 1, wherein the inserting step is performed for a tuft of bristles, said tuft having an inner portion, and the inserting step being performed such that said inner portion is disposed outward of said second side; and further comprising the step of shaping said inner portion by shifting at least one of said bristles relative to another of said bristles, the shaping step being performed during or after the inserting step.

* * * * *